United States Patent
Chen (10) Patent No.: US 10,355,502 B2
(45) Date of Patent: Jul. 16, 2019

(54) ELECTRONIC DEVICE STORAGE AND CHARGING CABINET

(71) Applicant: CHEN-SOURCE INC., Taoyuan (TW)

(72) Inventor: Yun-Hao Chen, Taoyuan (TW)

(73) Assignee: CHEN-SOURCE INC., Taoyuan (TW)

( * ) Notice: Subject to any disclaimer, the term of this patent is extended or adjusted under 35 U.S.C. 154(b) by 180 days.

(21) Appl. No.: 15/372,997

(22) Filed: Dec. 8, 2016

(65) Prior Publication Data

US 2018/0166896 A1 Jun. 14, 2018

(51) Int. Cl.
*H01M 10/46* (2006.01)
*H02J 7/00* (2006.01)

(52) U.S. Cl.
CPC .......... *H02J 7/0044* (2013.01); *H02J 7/0027* (2013.01)

(58) Field of Classification Search
CPC .. H02J 7/355; H02J 7/0042; H02J 2007/0062; E05G 7/00
USPC ......... 320/107, 111, 114, 115, 116; 312/244, 312/215, 198; 429/99, 100
See application file for complete search history.

(56) References Cited

U.S. PATENT DOCUMENTS

| | | | | |
|---|---|---|---|---|
| 8,320,110 B2* | 11/2012 | Chen | ..................... | G06F 1/1632 235/462.46 |
| 8,456,819 B1* | 6/2013 | Smith | ..................... | A47B 96/00 312/223.1 |
| 2012/0078413 A1* | 3/2012 | Baker, Jr. | ................ | G07F 17/12 700/232 |
| 2013/0175993 A1* | 7/2013 | Chen | ..................... | H02J 7/0027 320/114 |
| 2016/0020625 A1* | 1/2016 | Tsou | ..................... | H02J 7/0044 320/115 |
| 2017/0027079 A1* | 1/2017 | Dombrowski | ............ | H02J 5/00 |

* cited by examiner

Primary Examiner — Edward Tso
(74) Attorney, Agent, or Firm — Muncy, Geissler, Olds & Lowe, P.C.

(57) ABSTRACT

A charging cabinet includes a housing including a plurality of horizontal storage chambers for storing mobile electronic devices, a mounting chamber at a back side relative to the horizontal storage chambers, a plurality of flip covers pivotally mounted at a front panel thereof and biasable to close/open the respective horizontal storage chambers and clocks for locking the respective flip covers, and a power supply unit including a power input module mounted at a back panel of the housing and electrically connectable to an external power source for power input, and a power socket module and an expansion module respectively electrically connected to the power input module with respective power jacks and respective USB connectors thereof arranged at different elevations to face toward the respective horizontal storage chambers for the connection of the respective storage mobile electronic device for charging.

8 Claims, 7 Drawing Sheets

ELECTRONIC DEVICE STORAGE AND CHARGING CABINET

BACKGROUND OF THE INVENTION

1. Field of the Invention

The present invention relates to mobile electronic device storage and charging technology, and more particularly to a charging cabinet, which comprises a housing defining therein multiple horizontal storage chambers for storing mobile electronic devices, flip covers mounted at the housing and biasable to close/open the respective horizontal storage chambers, locks for locking the respective flip covers, and a power supply unit consisting of a power input module, a power socket module and an expansion module for charging all storage mobile electronic devices, facilitating mobile electronic device storage and charging management and ensuring storage security.

2. Description of the Related Art

With fast development of electronic and multimedia technologies, advanced and sophisticated notebook computers, tablet computer, smart phone, PDA and many other mobile electronic devices have been continuously created and appeared on the market. These mobile electronic devices have the characteristics of small size, light weight and high mobility. With continuous creation of hardware and software functions, mobile electronic devices are widely used in our daily life for different applications.

However, because advanced electronic products are more and more powerful, electronic products, such as smart phones, tablet computers, notebook computers or the like, are very power-hungry. Therefore, the internal battery power of a mobile electronic device can be exhausted soon while the user using the mobile electronic device is walking. When the battery power of the mobile electronic device is low, the user needs to find the nearest power supply outlet for charging the battery of the mobile electronic device.

However, when you are going out (for example, go out to a department store, hospital, etc.), you will be difficult to find a power supply outlet for charging the battery power of a mobile electronic device. Even if you find a power supply outlet and use it to charge the battery power of your mobile electronic device, you still need to stand there for a certain period of time during charging (the charging time normally will take about 45 minutes, or even 2 to 3 hours) to prevent the mobile electronic device from being stolen by others. Thus, in the process of charging you cannot do what you want to do, and will waste a lot of time. So, most people would prefer to return home or office to charge their mobile electronic devices, resulting in inconvenience in use.

Therefore, how to solve the above-mentioned problems and disadvantages is the direction of improvement the related manufacturers need to study.

SUMMARY OF THE INVENTION

The present invention has been accomplished under the circumstances in view. It is the main object of the present invention to provide a charging cabinet, which comprises a housing that comprises an accommodation chamber and a mounting chamber separated by a base thereof, a plurality of partition plates mounted at the base at different elevations to divide the accommodation chamber into a plurality of individual horizontal storage chambers, a plurality of flip covers pivotally mounted at a front panel thereof and biasable to close/open the respective horizontal storage chambers and clocks for locking the respective flip covers, and a power supply unit that comprises a power input module mounted at a back panel of the housing and electrically connectable to an external power source for power input, and a power socket module and an expansion module respectively electrically connected to the power input module with respective power jacks and respective USB connectors thereof arranged at different elevations to face toward the respective horizontal storage chambers for the connection of the respective storage mobile electronic device for charging. Thus, the user needs not to find any other charging host or charging power supply and can charge a large amount of storage mobile electronic devices efficiently at a time, saving much charging labor and time and bringing convenience.

According to another aspect of the present invention, the user can open or close the flip covers of the front panel of the housing. When opened one flip cover, the user can put one mobile electronic device into one respective horizontal storage chamber for storage or charging, or take the mobile electronic device out of the respective horizontal storage chamber for use. When closed the flip cover, the user can operate the respective lock to lock the flip cover, preventing the storage mobile electronic device from being stolen and ensuring safe storage.

Further, subject to the design that the horizontal partition plates of the base of the housing divide the accommodation chamber into a plurality of individual horizontal storage chambers and the design that the flip covers of the front panel are arranged to close one respective individual horizontal storage chamber and the design that one respective lock is disposed at one lateral side relative to one respective flip cover for locking the respective flip cover, and thus, every horizontal storage chamber is an independent storage chamber, and thus, the charging cabinet can be provided for multiple users, allowing every user to use one respective individual horizontal storage chamber for storing and charging personal mobile electronic devices, ensuring storage security.

Further, the power socket module and expansion module of the power supply unit are mounted at the base in the mounting chamber. If the power socket module or the expansion module fails, the maintenance worker can open the adjacent side panel and access to the mounting chamber to repair or replace the power socket module or expansion module. Thus, repairing the power socket module and expansion module of the power supply unit is quite convenient and free from space limitations.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
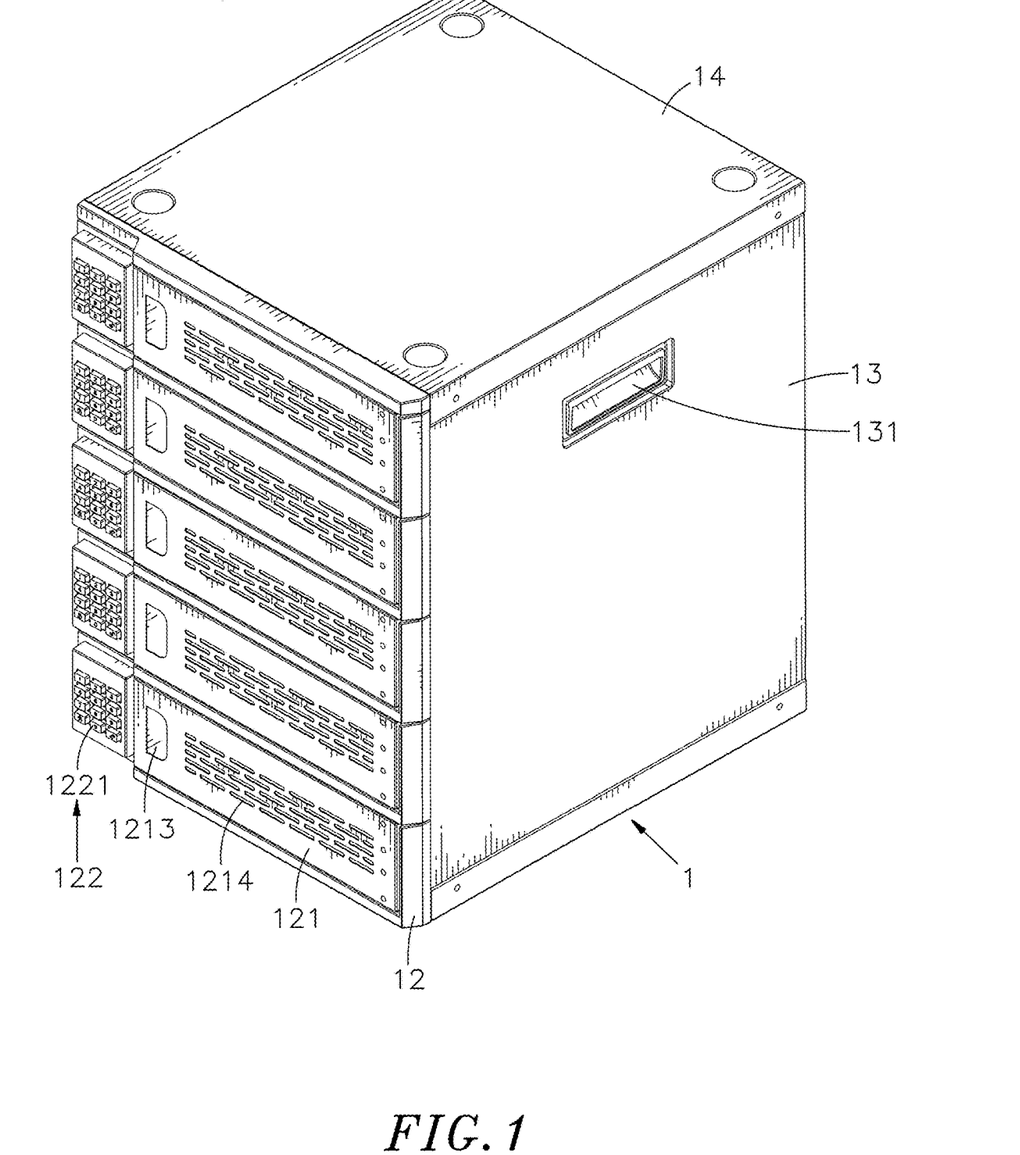
FIG. 1 is an oblique top elevational view of a charging cabinet in accordance with the present invention.
Figure 2:
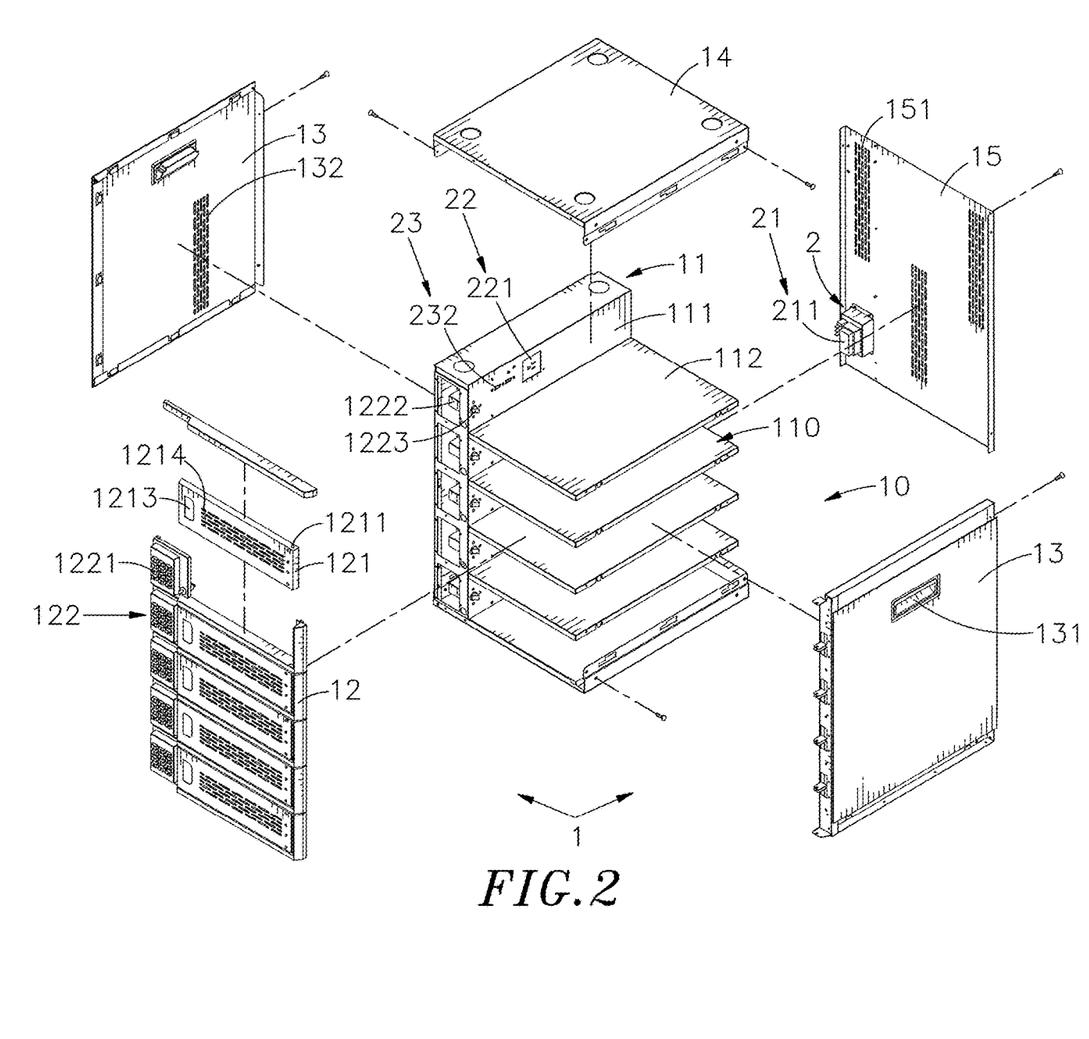
FIG. 2 is an exploded view of the charging cabinet in accordance with the present invention.
Figure 3:
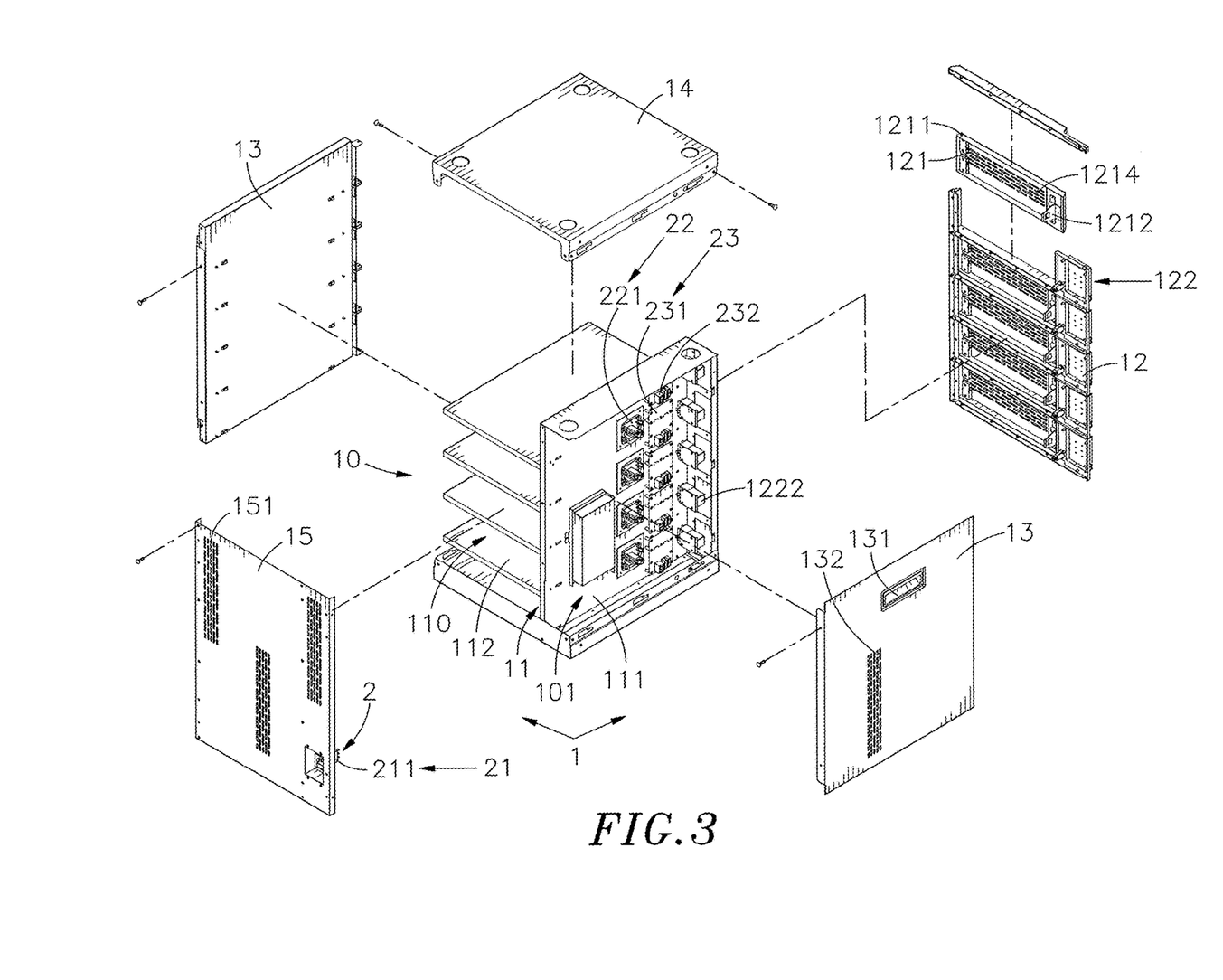
FIG. 3 corresponds to FIG. 2 when viewed from another angle.
Figure 4:
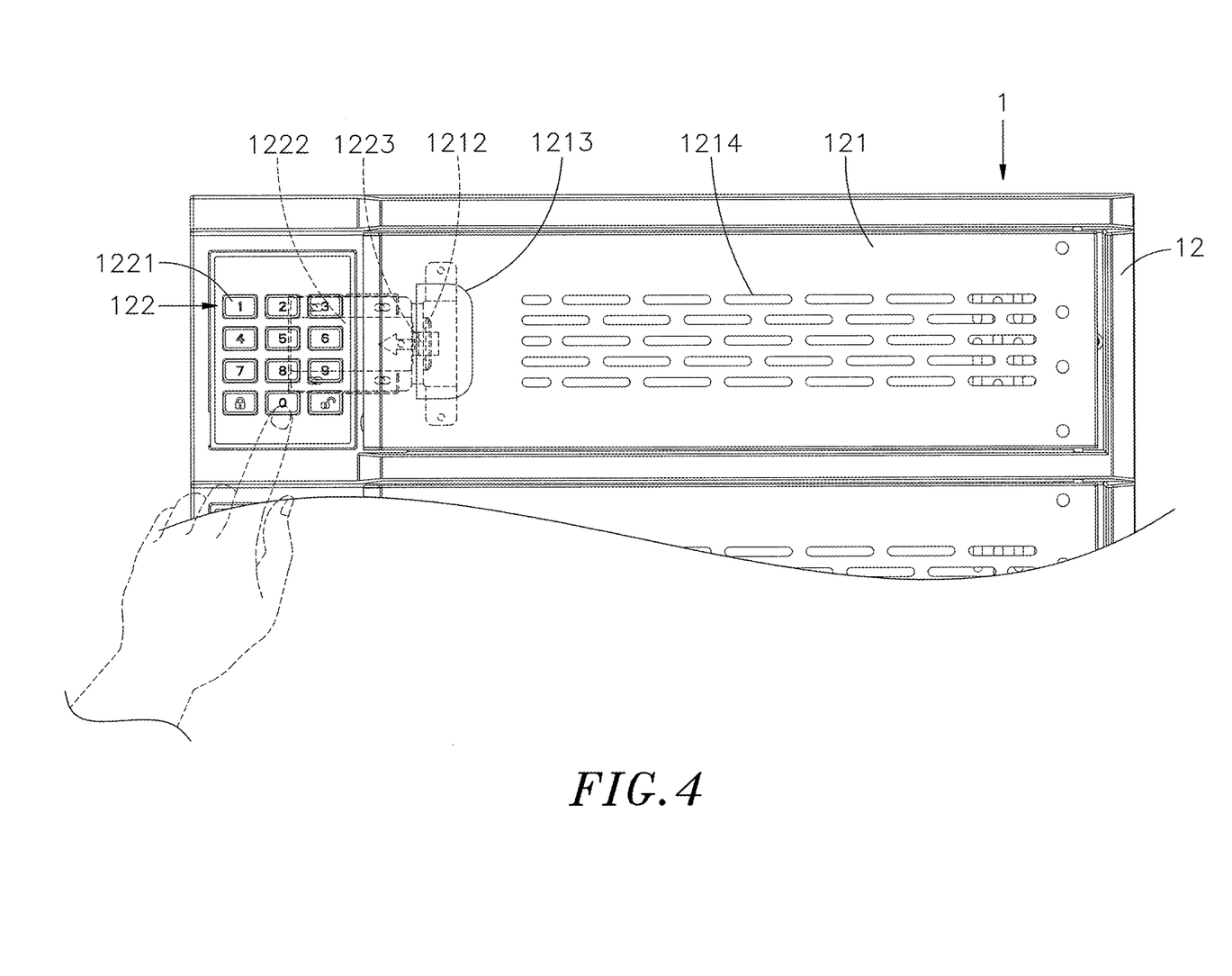
FIG. 4 is a schematic drawing illustrating the arrangement of one lock relative to the respective flip cover and the operation of the numeric keys.
Figure 5:
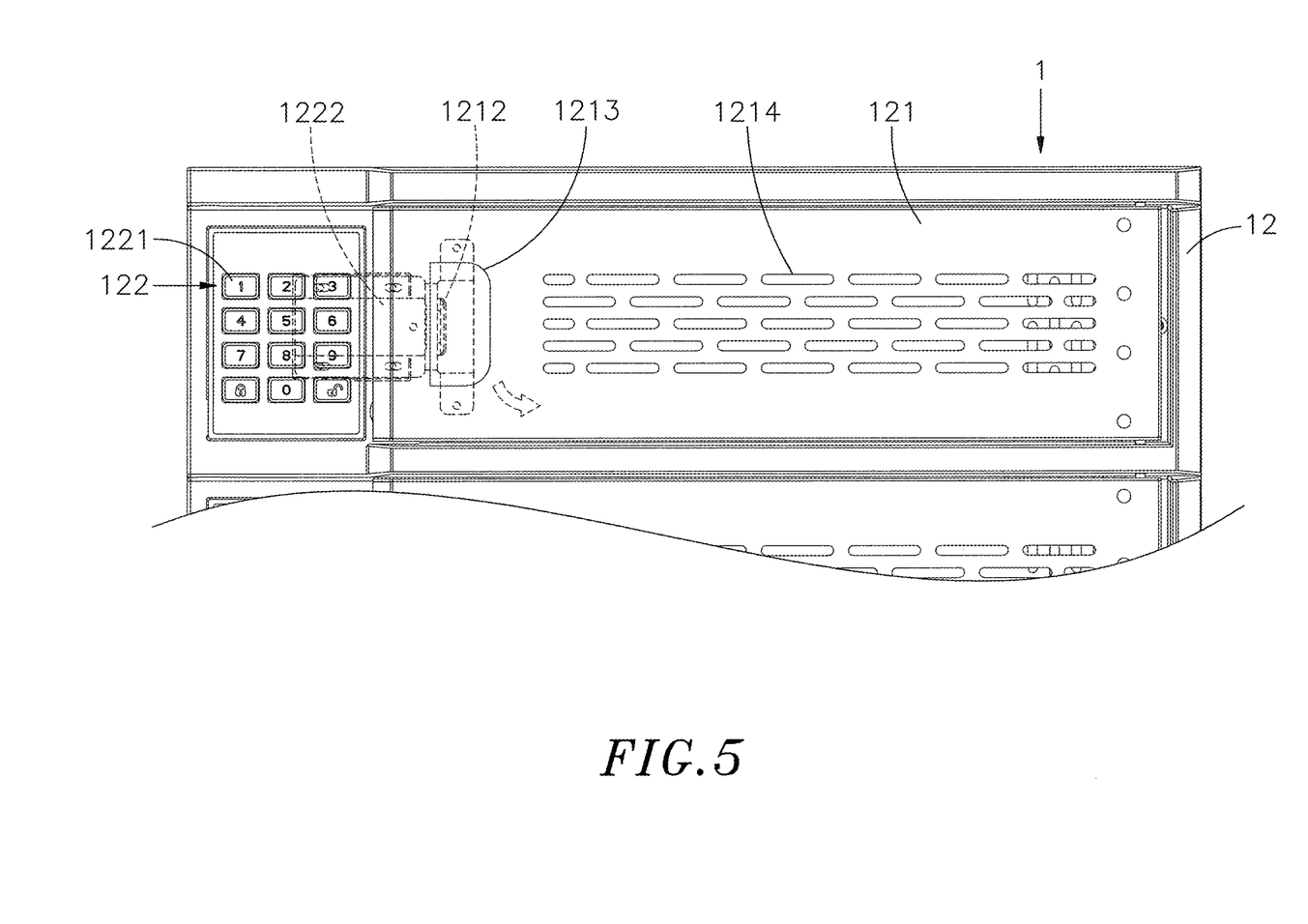
FIG. 5 corresponds to FIG. 4, illustrating the lock unlocked.

Referring to FIGS. 1-3, a charging cabinet in accordance with the present invention is shown. The charging cabinet comprises a housing 1 and a power supply unit 2.

The housing 1 comprises a base 11, a top panel 14 horizontally mounted at a top side of the base 11, a front panel 12 vertically mounted at a front side of the base 11, a back panel 15 vertically mounted at an opposing back side of the base 11, two opposing side panels 13 respectively and vertically mounted at two opposing lateral sides of the base 11, an accommodation chamber 10 surrounded by the base 11, the top panel 14, the front panel 12, the back panel 15 and one side panel 13, and a mounting chamber 101 defined between the base 11 and the other side panel 13. The mounting chamber 101 is relatively smaller than the accommodation chamber 10. The base 11 comprises an upright frame plate 111, a plurality of horizontal partition plates 112 perpendicularly connected to a front wall of the upright frame plate 111 at different elevations, defining a plurality of horizontal storage chambers 110 in the accommodation chamber 10. The mounting chamber 101 is defined between an opposing back wall of the upright frame plate 111 and the said other side panel 13.

The front panel 12 comprises a plurality of flip covers 121 respectively disposed at different elevations corresponding to the respective horizontal storage chambers 110. Further, a plurality of locks 122 are provided for locking the flip covers 121 respectively. Further, each flip cover 121 comprises a mounting axle 1211 pivotally coupled to the front panel 12, a hook 1212 backwardly extended from a back wall thereof, a recessed finger pull 1213 located on an opposing front wall thereof for enabling a user to open the front panel 12 with fingers, and a plurality of perforations 1214 cut through the opposing front and back walls and surrounded by the recessed finger pull 1213 and the mounting axle 1211. Each lock 122 comprises a set of numeric keys 1221 arranged at one lateral side of the flip cover 121, a lock body 1222 mounted at the upright frame plate 111 within the mounting chamber 101, and a latch 1223 extended from the lock body 1222 and inserted through the upright frame plate 111 into the accommodation chamber 10. Further, each side panel 13 comprises a recessed grip handle 131, and a plurality of air vents 132. The back panel 15 comprises a plurality of heat dissipation holes 151 cut through opposing front and back walls thereof.

In the present preferred embodiment, the locks 122 are combination locks; however, in actual application, checkmark locks, numeric locks, key locks or fingerprint locks can be selectively used as substitutes.

The power supply unit 2 comprises a power input module 21, a power socket module 22, and an expansion module 23. The power input module 21 comprises at least one power adapter 211. The power adapter 211 can be a power plug or power socket. If the power adapter 211 is a power socket, connect a plug at one end of a power cable (not shown) to the power adapter 211, and then connect another plug at an opposite end of the power cable to an external power source (such as city power supply outlet, power supply device or power generator). The power socket module 22 comprises a plurality of power jacks 221 electrically connected to the power adapter 211 of the power input module 21 with power wiring. Thus, external AC power supply can be inputted into the power adapter 211 and then provided to the power jacks 221 for application. The expansion module 23 comprises a plurality of charging circuit boards 231 electrically connected to the power adapter 211 of the power input module 21 with power wiring, and a USB connector 232 mounted at each charging circuit board 231. The charging circuit boards 231 are adapted for converting AC power supply inputted from the power adapter 211 in DC power supply for the respective USB connectors 232.

In installation, mount the power input module 21 of the power supply unit 2 at the back wall of the back panel 15 of the housing 1 in one lower corner, enabling the power adapter 211 to be exposed out of the front wall of the back panel 15. Thereafter, mount the power socket module 22 and the expansion module 23 of the power supply unit 2 at the base 11 to face toward the mounting chamber 101, enabling the power jacks 221 of the power socket module 22 and the charging circuit boards 231 of the expansion module 23 to be arranged in two vertical lines on the upright frame plate 111 so that at least one power jack 221 and at least one USB connector 232 are disposed in each horizontal storage chamber 110. Thereafter, affix the front panel 12, the side panels 13, the top panel 14 and the back panel 15 to the base 11 to establish a cabinet.

Referring to FIGS. 4-7, the charging cabinet is practical for use in department stores, hypermarkets, transportation terminals, swimming pools, schools, or any other public storage places. The user can hold the recessed grip handles 131 of the side panels 13 to carry the housing 1 or to put it on a table, the ground or any other platform. Further, the user can operate the numeric keys 1221 of each lock 122 to input the predetermined sequence of numbers, unlocking the latch 1223 of each lock 122 from the hook 1212 of the respective flip cover 121. After unlocked one the lock 122, the user can insert one finger into the recessed finger pull 1213 of the respective flip cover 121 and then bias the respective flip cover 121 to rotate the associating mounting axle 1211 relative to the respective front panel 12, thereby opening the respective flip cover 121. After opened the flip cover 121 of one the front panel 12, the user can then put a mobile electronic device 3 (such as smart phone, tablet computer, notebook computer, etc.) into the respective horizontal storage chamber 110, and then use a charging cable 31 to electrically connect the mobile electronic device 3 to one respective power jack 221 of the power socket module 22, or use a USB cable 32 to electrically connect the mobile electronic device 3 to one respective USB connector 232 of the expansion module 23. At this time, since the power input module 21 of the power supply unit 2 is electrically connected to the external power source, the power input module 21 can electrically charge the mobile electronic device 3 with the external power source through the power socket module 22 or the expansion module 23. When the user closes the respective flip cover 121, the hook 1212 of the respective flip cover 121 will be hooked up with the latch 1223 of the respective lock 122, locking the respective flip cover 121 in the close position.

Figure 6:
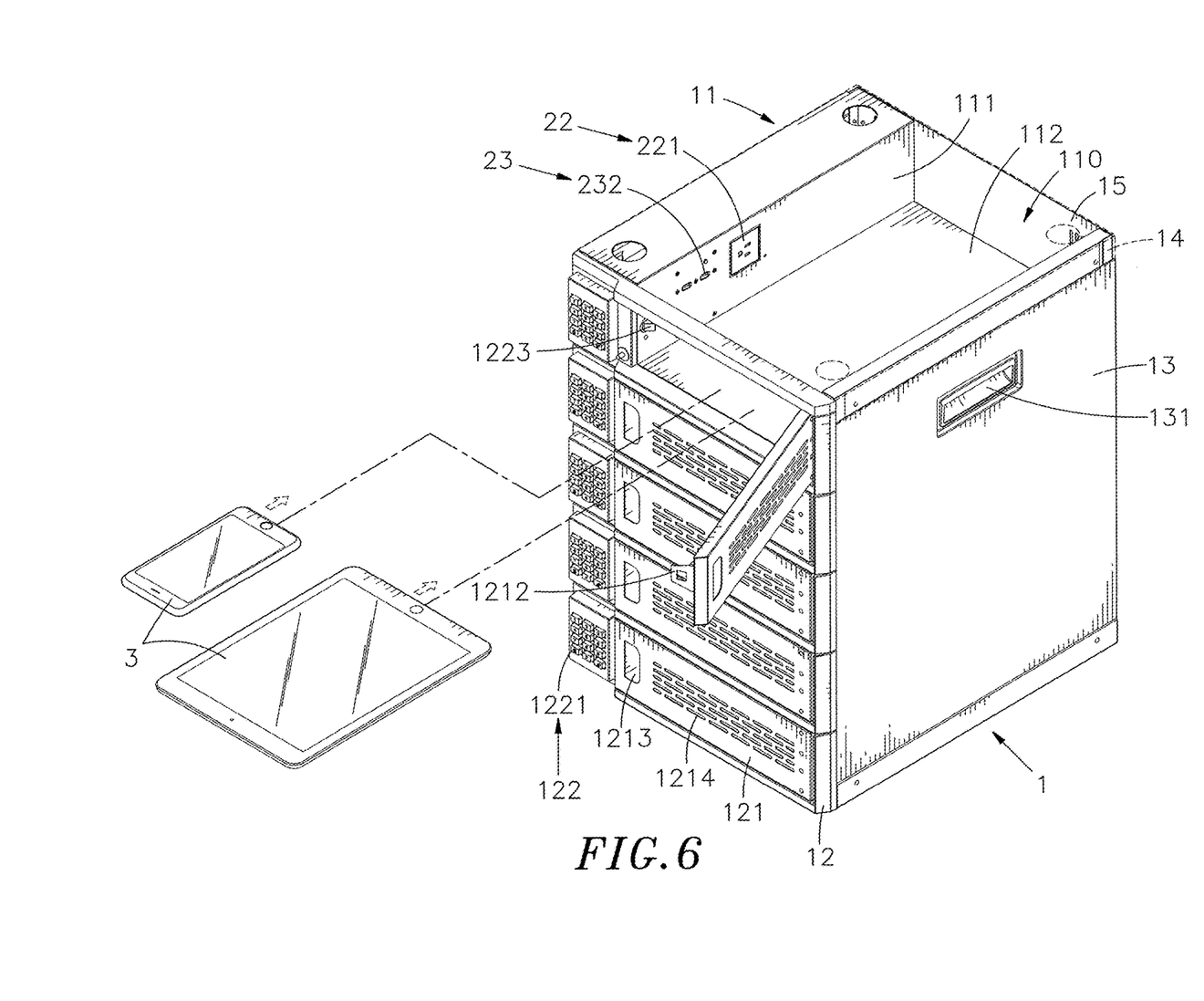
FIG. 6 is a schematic applied view of the present invention, illustrating one flip cover opened for allowing storage of mobile electronic devices in one respective horizontal storage chamber.
Figure 7:
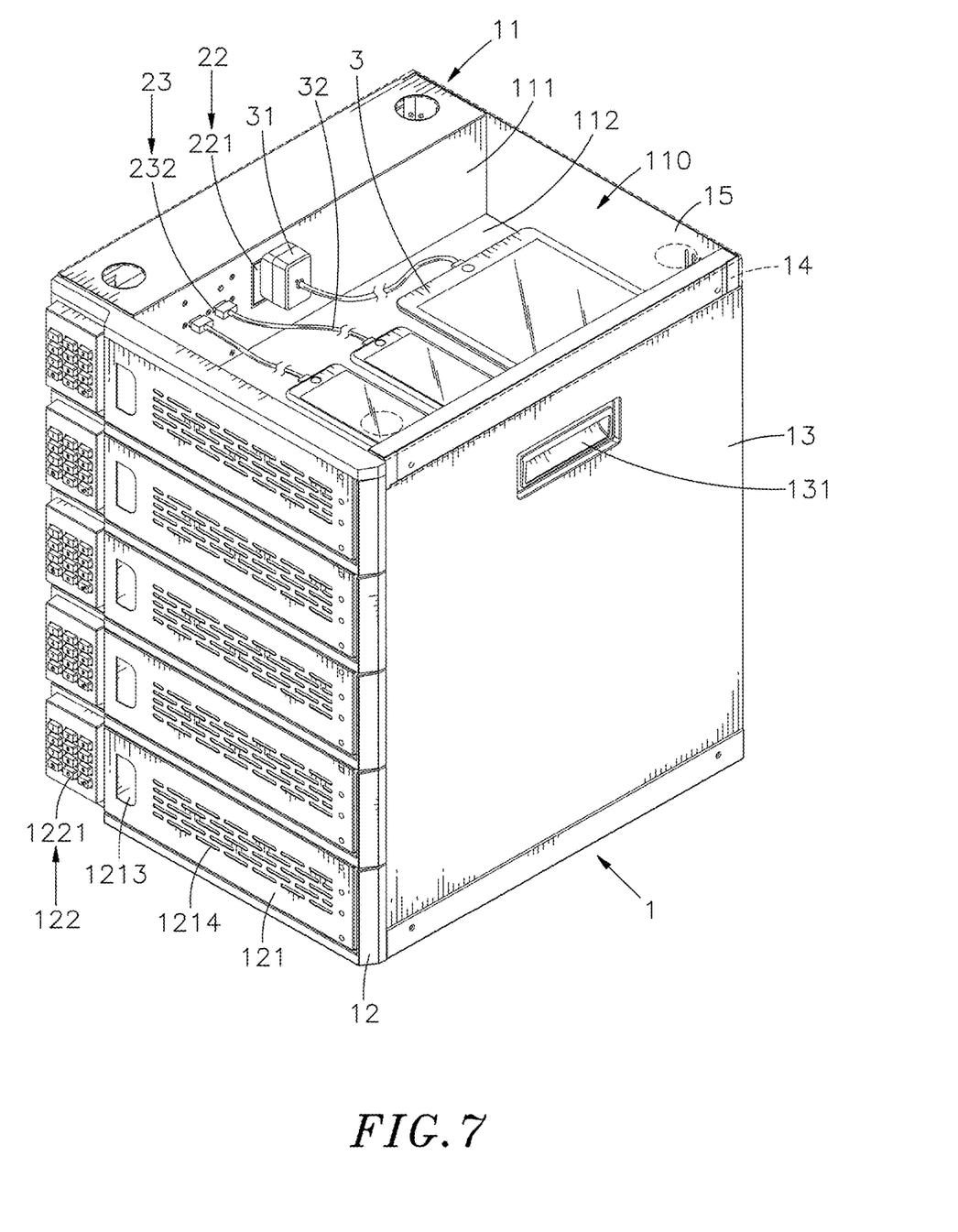
FIG. 7 is a schematic applied view of the present invention, illustrating multiple mobile electronic devices stored in one horizontal storage chamber and electrically connected to the associating power jack and USB connectors.

As stated above, the horizontal partition plates 112 of the base 11 of the housing 1 divide the accommodation chamber 10 into a plurality of horizontal storage chambers 110 for the storage of at least one mobile electronic device 3 in each horizontal storage chamber 110, facilitating centralized management. Further, every mobile electronic device 3 stored in one respective horizontal storage chamber 110 can be electrically connected to one the respective power jack 221 or the USB connector 232 at the upright frame plate 111 and electrically charged by the external power source that is inputted into the power input module 21 of the power supply unit 2. Thus, the user needs not to find any other charging host or charging power supply and can charge a large amount of storage mobile electronic devices 3 efficiently at a time, saving much charging labor and time and bringing convenience.

Further, the user can open or close the flip covers 121 of the front panel 12 of the housing 1. When opened one the flip cover 121, the user can put one the mobile electronic device 3 into one respective horizontal storage chamber 110 for storage or charging, or take the mobile electronic device 3 out of the respective horizontal storage chamber 110 for use. When closed the flip cover 121, the user can operate the respective lock 122 to lock the flip cover 121, preventing the storage mobile electronic device 3 from being stolen and ensuring safe storage.

Subject to the design that the horizontal partition plates 112 of the base 11 of the housing 1 divide the accommodation chamber 10 into a plurality of individual horizontal storage chambers 110 and the design that the flip covers 121 of the front panel 12 are arranged to close one the respective individual horizontal storage chamber 110 and the design that one the respective lock 122 is disposed at one lateral side relative to one the respective flip cover 121 for locking the respective flip cover 121, and thus, every horizontal storage chamber 110 is an independent storage chamber, and thus, the charging cabinet can be provided for multiple users, allowing every user to use one the respective individual horizontal storage chamber 110 for storing and charging the personal mobile electronic devices 3, ensuring storage security.

Further, the power socket module 22 and the expansion module 23 of the power supply unit 2 are mounted at the base 11 in the mounting chamber 101. If the power socket module 22 or the expansion module 23 fails, the maintenance worker can open the adjacent side panel 13 and access to the mounting chamber 101 to repair or replace the power socket module 22 or the expansion module 23. Thus, repairing the power socket module 22 and the expansion module 23 of the power supply unit 2 is quite convenient and free from space limitations.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A charging cabinet, comprising:
a housing comprising a base, a top panel horizontally mounted at a top side of said base, a front panel vertically mounted at a front side of said base, a back panel vertically mounted at an opposing back side of said base, two opposing side panels respectively and vertically mounted at two opposing lateral sides of said base, an accommodation chamber surrounded by said base, said top panel, said front panel, said back panel and one said side panel and a mounting chamber defined between said base and the other said side panel, said mounting chamber being relatively smaller than said accommodation chamber, said base comprising an upright frame plate, a plurality of horizontal partition plates perpendicularly connected to a front wall of said upright frame plate at different elevations and dividing said accommodation chamber into a plurality of horizontal storage chambers for the storage of mobile electronic devices, said mounting chamber being defined between an opposing back wall of said upright frame plate and the other said side panel, said front panel comprising a plurality of flip covers respectively disposed at different elevations and configured to openably close the respective said horizontal storage chambers and a plurality of locks adapted for locking the respective said flip covers; and
a power supply unit comprising a power input module electrically connectable to an external power source for electrical power input, a power socket module electrically connected to said power input module and mounted at said base within said mounting chamber and an expansion module electrically connected to said power input module and mounted at said base within said mounting chamber, said power socket module comprising a plurality of power jacks mounted at said upright frame plate at different elevations to face toward the respective said horizontal storage chambers, said expansion module comprising a plurality of charging circuit boards mounted at said upright frame plate and a plurality of USB connectors respectively electrically connected to said charging circuit boards and respectively disposed to face toward the respective said horizontal storage chambers,
wherein each lock comprises a set of numeric keys arranged at one lateral side relative to the respective said flip cover, a lock body mounted at the upright frame plate within the mounting chamber, and a latch movable in and out of said lock body and insertable through said upright frame plate into the accommodation chamber for engagement with a hook of the respective said flip cover.

2. The charging cabinet as claimed in claim 1, wherein each said flip cover comprises a mounting axle pivotally coupled to said front panel, said hook backwardly extended from a back wall thereof, a recessed finger pull located on an opposing front wall thereof for enabling a user to open said front panel with fingers, and a plurality of perforations cut through the opposing front and back walls and surrounded by said recessed finger pull and said mounting axle.

3. The charging cabinet as claimed in claim 1, wherein each said side panel of said housing comprises a recessed grip handle, and a plurality of air vents.

4. The charging cabinet as claimed in claim 1, wherein said back panel comprises a plurality of heat dissipation holes cut through opposing front and back walls thereof.

5. The charging cabinet as claimed in claim 1, wherein said power input module of said power supply unit comprises a power adapter electrically connectable to an external power source.

6. The charging cabinet as claimed in claim 5, wherein said power input module is mounted at a back panel of a housing to hold said power adapter outside said back panel; said power adapter is a power jack.

7. The charging cabinet as claimed in claim 1, wherein said power input module of said power supply unit is adapted for transmitting AC power supply to said power socket module.

8. The charging cabinet as claimed in claim 1, wherein said charging circuit boards of said expansion module are adapted for converting AC power supply from said power input module into DC power supply and providing said DC power supply to said USB connectors.

\* \* \* \* \*